(12) United States Patent
Tse

(10) Patent No.: US 7,017,752 B2
(45) Date of Patent: Mar. 28, 2006

(54) APPARATUS AND METHOD OF SEPARATING SMALL RUBBISH AND ORGANIC MATTERS FROM GARBAGE FOR COLLECTION

(75) Inventor: Steven Tse, Room G08, Block 7, Kang Yuan, Guangzhou Country Garden, Dashi, Panyu, Guangzhou City, Guangdong, 511430 (CN)

(73) Assignee: Steven Tse, Guangzhao (CN)

( * ) Notice: Subject to any disclaimer, the term of this patent is extended or adjusted under 35 U.S.C. 154(b) by 223 days.

(21) Appl. No.: 10/436,111

(22) Filed: May 13, 2003

(65) Prior Publication Data

US 2004/0144693 A1    Jul. 29, 2004

(51) Int. Cl.
*B03B 5/64* (2006.01)

(52) U.S. Cl. ............... 209/162; 209/164; 209/156; 209/268; 209/272; 209/665; 209/930

(58) Field of Classification Search ............ None
See application file for complete search history.

(56) References Cited

U.S. PATENT DOCUMENTS

| | | | | |
|---|---|---|---|---|
| 3,042,198 A | * | 7/1962 | Slavich ................. | 209/44 |
| 3,650,396 A | * | 3/1972 | Gillespie et al. ........ | 209/3.1 |
| 3,802,631 A | * | 4/1974 | Boyd .................... | 241/20 |
| 4,929,342 A | * | 5/1990 | Johnston ................ | 209/31 |
| 5,339,961 A | * | 8/1994 | Mayhak ................. | 209/3 |
| 5,465,847 A | * | 11/1995 | Gilmore ................ | 209/12.1 |

* cited by examiner

*Primary Examiner*—Donald P. Walsh
*Assistant Examiner*—Jonathan R Miller
(74) *Attorney, Agent, or Firm*—Ware, Fressola, Van Der Sluys & Adolphson LLP

(57) ABSTRACT

An apparatus and method of separating small rubbish and organic matters from garbage for collection by means of water by considering specific weight, buoyancy, and flow rate of water is disclosed. The apparatus comprises a plurality of conveyor screens incorporating injection nozzles, a less inclined channel, a conveyor, and an organic matter screen for effectively separating floated rubbish, organic matters, and sunk rubbish from garbage for collection.

10 Claims, 4 Drawing Sheets

APPARATUS AND METHOD OF SEPARATING SMALL RUBBISH AND ORGANIC MATTERS FROM GARBAGE FOR COLLECTION

BACKGROUND OF THE INVENTION

1. Field of the Invention

The present invention relates to garbage disposal and more particularly to an apparatus and method of rapidly, effectively separating small rubbish and organic matters from garbage for collection.

2. Description of Related Art

As to garbage disposal, typically there are techniques, i.e., landfill and burning, widely used throughout the world. Many precious lands are used for landfill as more garbage is generated everyday. Underground water and soil may be polluted by buried garbage if an appropriate disposal is not done. As to burning, it can cause severe air pollution if smoke generated during burning is not well processed prior to discharge. As to generated ashes, they are buried after being generated. Hence, the problem of polluting underground water and soil still exists. Further, it is often that residents violently protest a garbage disposal site to be established in their neighborhood because they think it may degrade their living quality once established. Furthermore, the cost of disposing garbage is increased significantly as less land being available for landfill.

Resources on earth begin to deplete in recent years. Hence, more and more people are aware of the importance of resource recycling by actively cooperating with the resource recycling policy. It is desired that amount of garbage can be reduced significantly in a near future by successfully recycling resources in order to prolong a useful time of land for burying garbage and preserve limited resources on earth. However, the typical resource recycling (i.e., garbage recycling) techniques are unsatisfactory now. For example, a satisfactory garbage classification is not possible by the typical resource recycling techniques mainly because a wide variety of different materials are contained in garbage. The materials comprise toxic, nontoxic, large, small, dry, wet, soft, hard, light, and heavy ones. Hence, an effective classification among such materials is impossible by a known mechanical device. More often that a manual garbage classification is done. For example, encourage people to classify garbage or require cleaning employees to do the garbage classification after collection. In view of the above, the conventional garbage classification technique is tedious and low in efficiency. Moreover, the cleaning employees are susceptible of contracting diseases or being poisoned by contaminants or toxic materials contained in garbage. Hence, a need for improvement exists.

Thus, it is desirable to provide a novel apparatus and method of effectively separating small rubbish and organic matters from garbage for collection by means of water in order to overcome the above drawbacks of the prior art.

SUMMARY OF THE INVENTION

It is an object of the present invention to provide an apparatus and method of automatically, effectively separating floated rubbish, organic matters, and sunk rubbish from garbage for collection.

It is another object of the present invention to provide an apparatus and method of separating small rubbish and organic matters from garbage for collection while performing an initial cleaning.

It is a further object of the present invention to provide an apparatus and method of separating small rubbish and organic matters from garbage for collection while diluting toxic materials in garbage.

To attain the above mentioned objects and advantages, the method of comprising the steps of:

sifting out small rubbish and organic matters by pouring the garbage mixed with water into screen means, passing organic matters and small rubbish through the screen means to direct to a less inclined channel, and pushing the garbage not sifted and stayed on the screen means to a next stage for processing by spraying water from injection nozzle means under the screen means;

directing the sifted small rubbish and organic matters mixed with water to a less inclined channel;

collecting sunk small rubbish by directing sand and the sunk small rubbish to a V-shaped trough in a bottom of the less inclined channel and discharging sand and the sunk small rubbish out of the less inclined channel for collection via a drain pipe;

collecting floated rubbish on the less inclined channel by transporting the floated rubbish on the less inclined channel to a floated rubbish collection container for collection by an inclined conveyor having a lower portion sunk in water in the less inclined channel; and sifting out the organic matters in water by directing water contained organic matters in the less inclined channel to an organic matter screen for sifting out the organic matters and passing water through the organic matter screen for purification.

Preferably, the step of sifting out small rubbish and organic matters comprises the sub-steps of:

fine sifting by pouring the garbage mixed with water into a first conveyor screen having a plurality of meshed openings of about 4 cm to about 6 cm, passing fine organic matters and tiny rubbish in the garbage through the first conveyor screen to direct to the less inclined channel, and pushing the garbage not sifted out of the first conveyor screen by spraying water from the injection nozzle means under the first conveyor screen; and coarse sifting by pushing the garbage mixed with water from the first conveyor screen to fall on a conveyor second conveyor screen having a plurality of meshed openings of about 6 cm to about 8 cm and passing coarse organic matters and small rubbish having a size less than about 6 cm to about 8 cm in the garbage through the second conveyor screen to direct to the less inclined channel.

Preferably, the apparatus of the invention comprising:

a feed chute capable of moving in a vertical direction;

a screen assembly below an outlet of the feed chute, the screen assembly including a first waterway at a bottom side;

a less inclined channel outside the screen assembly, and coupled to the first waterway, a junction of the less inclined channel and the first waterway being at a highest position of the less inclined channel, the less inclined channel including an outlet at the other lowest end thereof, a much less inclined section at an intermediate portion thereof, a V-shaped trough in a bottom thereof, and a drain pipe at a bottom of the V-shaped trough for discharging sand and small rubbish sunk in the V-shaped trough;

an upward inclined conveyor above the much less inclined section between the V-shaped trough and the outlet of the less inclined channel, the conveyor having a lower portion sunk in water in the much less inclined section;

an organic matter screen below the outlet of the less inclined channel; and a floated rubbish collection container for collecting floated rubbish sent from the floated rubbish collection container.

Preferably, the apparatus of the invention further comprises:

a first conveyor screen below and extended outward from the outlet of the feed chute, the first conveyor screen including a plurality of meshed openings and a bottom coupled to the first waterway;

a tray below and extended outward from the first conveyor screen;

a plurality of first injection nozzles under the first conveyor screen for obliquely spraying water toward surfaces of the first conveyor screen and the tray;

a second conveyor screen below and extended outward from the tray, the second conveyor screen having a plurality of meshed openings equal to or larger than that of the first conveyor screen; and a second waterway at a bottom side of the second conveyor screen coupled to the less inclined channel.

Preferably, the tray is substantially shaped as a rectangle and comprises two side walls, an outlet between the side walls and distal from the first conveyor screen, and an upward inclined edge at the outlet thereof, the upward inclined edge being adapted to slow a flow of the garbage through the outlet of the tray.

The above and other objects, features and advantages of the present invention will become apparent from the following detailed description taken with the accompanying drawings.

DETAILED DESCRIPTION OF THE PREFERRED EMBODIMENTS

Figure 1:
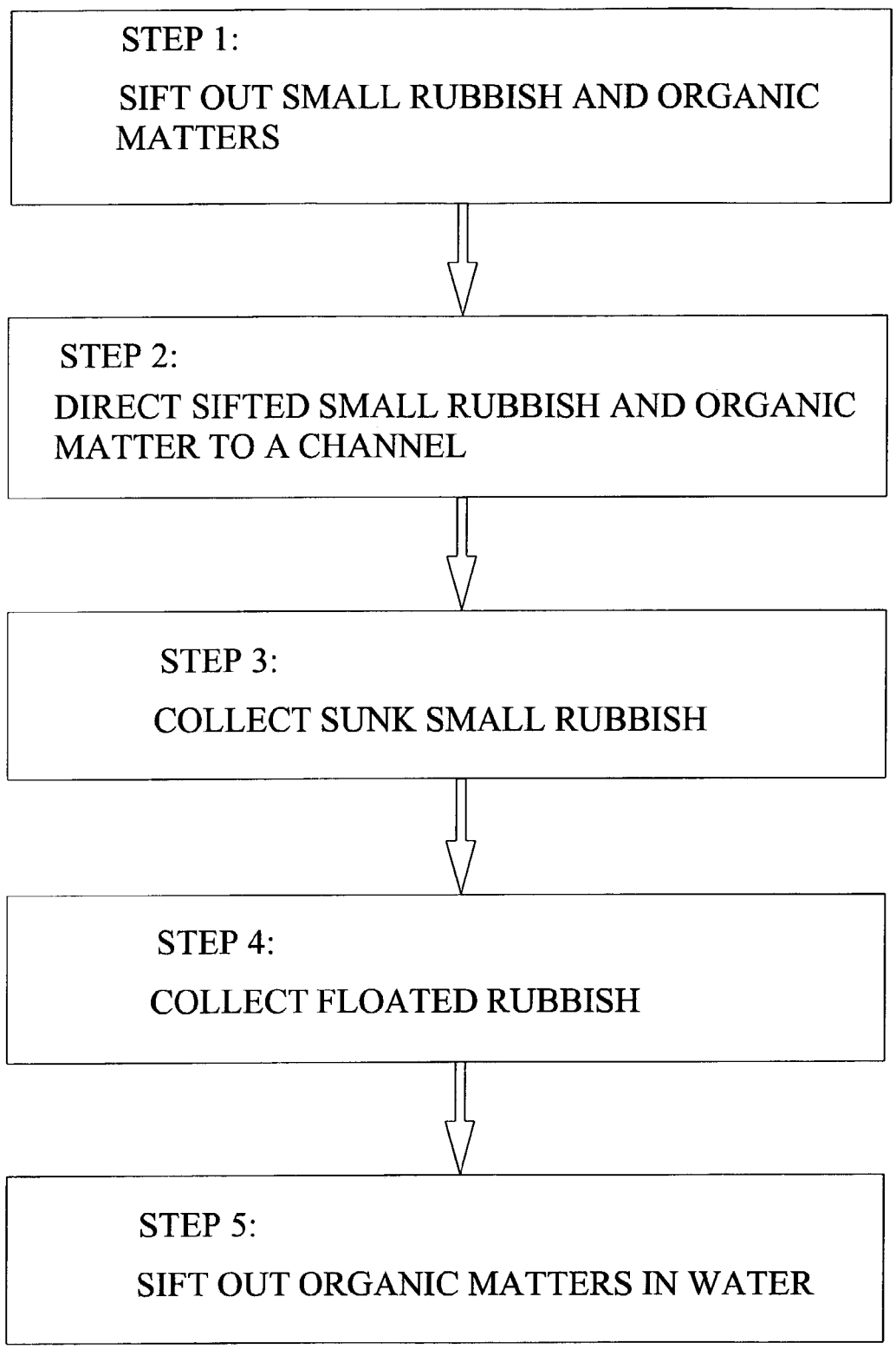
FIG. 1 is a flow chart showing a sequence of method steps performed by an apparatus according to the invention.

First mix garbage with water. Next, separate heavy garbage (i.e., garbage sunk in water) from garbage. A sequence of method steps are then performed by an apparatus of separating small rubbish and organic matters from garbage for collection in accordance with the invention as referring to FIG. 1.

In step 1, sift out small rubbish and organic matters. In detail, pour garbage mixed with water into a first conveyor screen having a plurality of meshed openings of about 4 cm to about 6 cm. As such, fine organic matters and tiny rubbish are able to pass through the first conveyor screen to direct to a first waterway. The garbage not sifted is stayed on the first conveyor screen and is immediately pushed to a conveyor second conveyor screen having a plurality of meshed openings of about 6 cm to about 8 cm by water sprayed from a plurality of first injection nozzles under the first conveyor screen. The garbage mixed with water arrived at the second conveyor screen will cause coarse organic matters and small rubbish having a size less than about 6 cm to about 8 cm thereof to pass through the second conveyor screen to direct to a second waterway. The garbage not sifted is stayed on the second conveyor screen and is immediately pushed to a next stage for processing by water sprayed from a plurality of second injection nozzles under the second conveyor screen.

In step 2, direct the sifted small rubbish, tiny rubbish, and organic matters mixed with water to a less inclined channel via the first and second waterways.

In step 3, collect sunk small rubbish. In detail, direct sand and sunk small rubbish to a V-shaped trough in a bottom of the less inclined channel. The sand and sunk small rubbish are then discharged out of the less inclined channel for collection via a drain pipe.

In step 4, collect floated rubbish on the less inclined channel. In detail, transport the floated rubbish on the less inclined channel to a floated rubbish collection container for collection by an inclined conveyor having a lower portion sunk in water in the much less inclined section.

In step 5, sift out organic matters in water. In detail, direct water contained organic matters of garbage in the less inclined channel to an organic matter screen in which organic matters will be sifted out by the organic matter screen and water will pass through the organic matter screen for purification. This completes the process of separating small rubbish and organic matters from garbage for collection.

Figure 2:
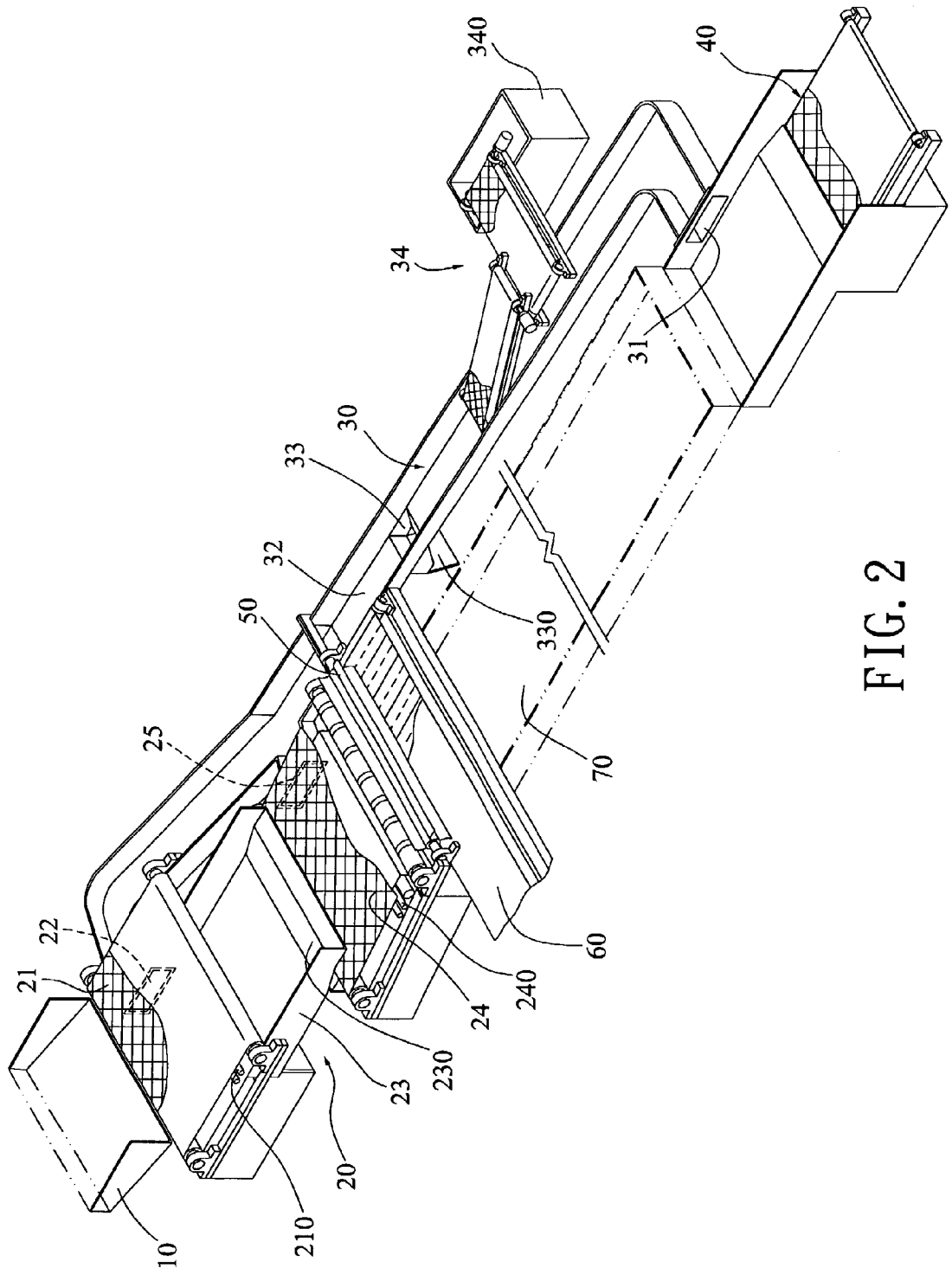
FIG. 2 is a schematic perspective view of a preferred embodiment of the apparatus.
Figure 3:
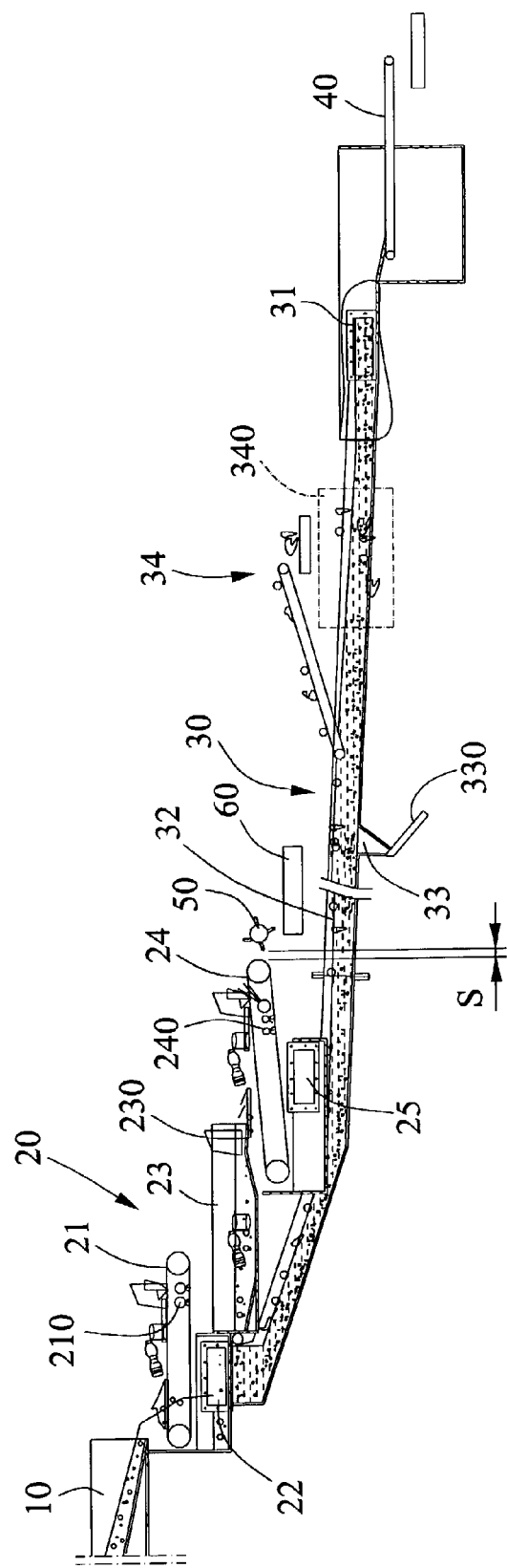
FIG. 3 is a cross-sectional view schematically illustrating the garbage disposal flow performed by the apparatus according to the invention.
Figure 4:
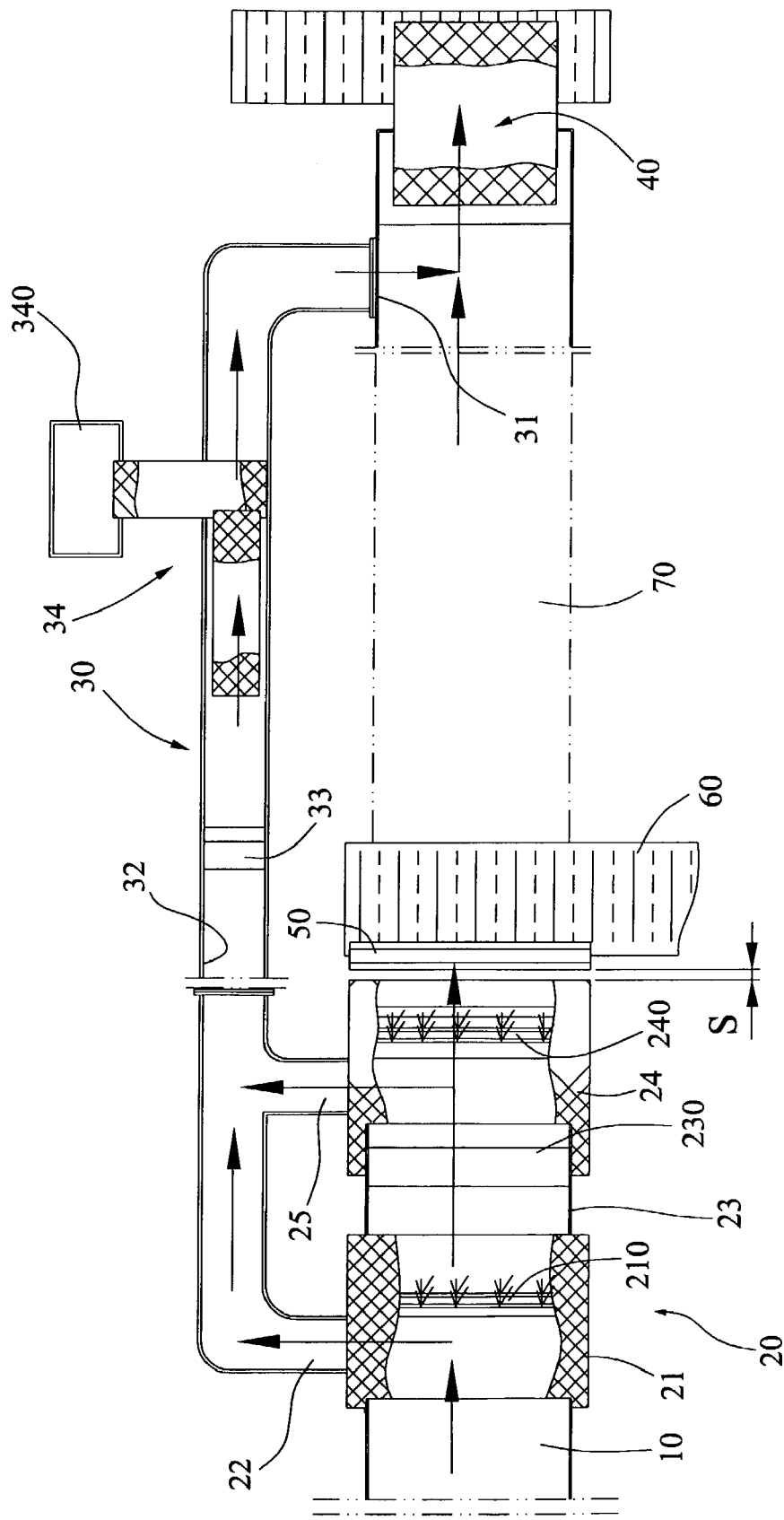
FIG. 4 is a top plan view schematically illustrating the garbage disposal flow shown in FIG. 3.

Referring to FIGS. 2, 3, and 4, the apparatus of separating small rubbish and organic matters from garbage for collection of the invention is shown. The apparatus comprises a feed chute 10 capable of moving in a vertical direction, the feed chute 10 having a section of U and a screen assembly 20 below an outlet of the feed chute 10. The screen assembly 20 comprises a first conveyor screen 21 below and extended outward from the outlet of the feed chute 10, the first conveyor screen 21 having a plurality of meshed openings of about 4 cm to about 6 cm so that fine organic matters and tiny rubbish in garbage are able to pass through to direct to a first waterway 22, the garbage not sifted is stayed on the first conveyor screen 21, a tray 23 below and extended outward from the first conveyor screen 21, the tray 23 being rectangular and having two side walls, an outlet between the side walls and distal from the first conveyor screen 21, and an upward inclined edge 230 at the outlet of the tray 23, the upward inclined edge 230 being adapted to slow the flow of garbage through the outlet of the tray 23, a plurality of first injection nozzles 210 under the first conveyor screen 21 for obliquely spraying water toward surfaces of the first conveyor screen 21 and the tray 23, and a second conveyor screen 24 below and extended outward from the tray 23, the second conveyor screen 24 having a plurality of meshed openings of about 6 cm to about 8 cm so as to cause coarse organic matters and small rubbish having a size less than about 6 cm to about 8 cm in garbage and water to pass through to direct to a second waterway 25, the first and second waterways 22, 25 being coupled to a less inclined channel 30 outside the screen assembly 20, a junction of the less inclined channel 30 and the first waterway 22 being at a highest position of the less inclined channel 30 while an outlet 31 being located at the other lowest end of the less inclined channel 30.

An organic matter screen 40 is formed below the outlet 31 of the less inclined channel 30, the organic matter screen 40 is formed of a nylon net and has about 200 to about 400 meshed openings. That is, the organic matter screen 40 has very small meshed openings. A much less inclined section 32 is formed at an intermediate portion of the less inclined channel 30. A V-shaped trough 33 is formed in a bottom of the less inclined channel 30. The V-shaped trough 33 has a bottom drain pipe 330 (see FIG. 3) for discharging sand and small rubbish sunk in the V-shaped trough 33. An upward inclined conveyor 34 is formed above the much less inclined section 32 of the less inclined channel 30 between the V-shaped trough 33 and the outlet 31. The conveyor 34 has a lower portion sunk in water in the much less inclined section 32 of the less inclined channel 30 and an upper portion right above a floated rubbish collection container 340.

An operation of the invention will now be described in detail below. First, mix garbage with water. Next, remove heavy materials out of the garbage. Next, adjust a height difference between the feed chute 10 and the first conveyor screen 21 to an optimum based on amount of organic matters in the garbage. For example, the feed chute 10 can be adjusted to a higher place for increasing the speed of water flow and the downward momentum of water if the amount of organic matters in the garbage is larger. As a result, the organic matters and small rubbish in garbage will have increased force to pass through the first conveyor screen 21. Next, pour the garbage mixed with water into the first conveyor screen 21. As such, fine organic matters and tiny rubbish in garbage are able to pass through the first conveyor screen 21 to direct to the less inclined channel 30 via the first waterway 22. The garbage not sifted is stayed on the first conveyor screen 21 and is immediately pushed to the tray 23 by water obliquely sprayed from the first injection nozzles 210 under the first conveyor screen 21. The garbage on the tray 23 will be sequentially pushed to fall onto the second conveyor screen 24 due to the provision of the upward inclined edge 230 at the outlet of the tray 23. This can avoid a garbage accumulation on the tray 23. The garbage mixed with water arrived at the second conveyor screen 24 will cause coarse organic matters and small rubbish having a size less than about 6 cm to about 8 cm thereof to pass through the second conveyor screen 24 to direct to the less inclined channel 30 via the second waterway 25. The garbage not sifted is stayed on the second conveyor screen 24 and is immediately pushed to a next stage for processing by water obliquely upward sprayed from a plurality of second injection nozzles 240 under the second conveyor screen 24. Note that the processing of garbage fed from the second conveyor screen 24 at the next stage is not pertinent to the invention. Thus a detailed description thereof is omitted herein for the sake of brevity.

Subsequently, the sifted small rubbish, tiny rubbish, and organic matters mixed with water continue to flow to the much less inclined section 32 of the less inclined channel 30 after passing the first and second waterways 22, 25. At the much less inclined section 32, sand and small articles such as cigarette lighters, absorbent cotton, etc. are deposited into the V-shaped trough 33 in the bottom of the less inclined channel 30 due to slow water flow. The sand and sunk small rubbish are then discharged out of the less inclined channel 30 for further processing via the drain pipe 330 (see FIG. 3). Moreover, floated rubbish and other organic matters mixed in water at the less inclined channel 30 continue to flow toward the outlet 31 of the less inclined channel 30. Also, the conveyor 34 is activated to transport the floated rubbish on the less inclined channel 30 to the floated rubbish collection container 340 for collection. At this time, materials in garbage remained at the less inclined channel 30 are organic matters mixed with water. The garbage flow containing organic matters continues to flow to the outlet 31 of the less inclined channel 30 prior to falling on the organic matter screen 40. The organic matters in garbage will be sifted out by the organic matter screen 40 having about 200 to about 400 meshed openings. There will be no accumulation of garbage on the organic matter screen 40 since the organic matter screen 40 is formed of nylon having a smooth surface (i.e., not sticky). Hence, the apparatus of the invention can collect almost all visible articles in garbage except very tiny ones such as oily materials, starch, etc. Finally, oily materials, starch, water, etc. are discharged to a next stage for purification processing.

The benefits of the invention include (1) providing a novel and unique garbage disposal implementation of rapidly, effectively, conveniently, and precisely separating floated rubbish, organic matters, and sunk rubbish from garbage for collection by means of water without involving a manual operation; (2) performing an initial cleaning of garbage by means of water while classifying garbage for facilitating a subsequent garbage recycling; (3) diluting toxic materials in garbage by means of water while classifying garbage for reducing a possibility of contracting diseases; and (4) providing an apparatus capable of effectively, rapidly, and precisely separating small rubbish and organic matters from garbage for collection.

While the invention herein disclosed has been described by means of specific embodiments, numerous modifications and variations could be made thereto by those skilled in the art without departing from the scope and spirit of the invention set forth in the claims.

What is claimed is:

1. A method of separating small rubbish and organic matters from garbage mixed with water and with heavy materials removed therefrom comprising the steps of:
    sifting out small rubbish and organic matters by pouring the garbage mixed with water into screen means, passing organic matters and small rubbish through the screen means to an inclined channel, and pushing the garbage not sifted and stayed on the screen means to a next stage for processing by spraying water from injection nozzle means under the screen means;
    collecting sunk small rubbish by directing sand and the sunk small rubbish to a trough means in a bottom of the inclined channel and discharging sand and the sunk small rubbish out of the inclined channel for collection via a drain pipe;
    collecting floated rubbish on the inclined channel by transporting the floated rubbish on the inclined channel to a floated rubbish collection container for collection by an inclined conveyor having a lower portion sunk in water in the inclined channel; and
    sifting out the organic matters in water by directing water contained organic matters in the inclined channel to an organic matter screen for sifting out the organic matters and passing water through the organic matter screen for purification.

2. The method of claim 1, wherein the step of sifting out small rubbish and organic matters comprises the sub-steps of:
    fine sifting by pouring the garbage mixed with water into a first conveyor screen having a plurality of meshed openings of about 4 cm to about 6 cm, passing fine organic matters and tiny rubbish in the garbage through the first conveyor screen to direct to the inclined channel, and pushing the garbage not sifted out of the first conveyor screen by spraying water from the injection nozzle means under the first conveyor screen; and
    coarse sifting by pushing the garbage mixed with water from the first conveyor screen to fall on a conveyor second conveyor screen having a plurality of meshed openings of about 6 cm to about 8 cm and passing coarse organic matters and small rubbish having a size less than about 6 cm to about 8 cm in the garbage through the second conveyor screen to direct to the inclined channel.

3. An apparatus of separating small rubbish and organic matters from garbage for collection comprising:

a feed chute capable of moving in a vertical direction;

a screen assembly below an outlet of the feed chute, the screen assembly including a first waterway at a bottom side;

a inclined channel outside the screen assembly, and coupled to the first waterway, a junction of the inclined channel and the first waterway being at a highest position of the inclined channel, the inclined channel including an outlet at the other lowest end thereof, an organic matter screen below the outlet of the inclined channel; and a floated rubbish collection container for collecting floated rubbish, wherein the screen assembly further comprises:

a first conveyor screen below and extended outward from the outlet of the feed chute, the first conveyor screen including a plurality of meshed openings and a bottom coupled to the first waterway;

a tray below and extended outward from the first conveyor screen;

a plurality of first injection nozzles under the first conveyor screen for obliquely spraying water toward surfaces of the first conveyor screen and the tray;

a second conveyor screen below and extended outward from the tray, the second conveyor screen having a plurality of meshed openings equal to or larger than that of the first conveyor screen; and a second waterway at a bottom side of the second conveyor screen coupled to the inclined channel.

4. The apparatus of claim 3, wherein the tray is substantially shaped as a rectangle and comprises two side walls, an outlet between the side walls and distal from the first conveyor screen, and an upward inclined edge at the outlet thereof, the upward inclined edge being adapted to slow a flow of the garbage through the outlet of the tray.

5. The apparatus of claim 3, wherein the meshed openings of the first conveyor screen are about 4 cm to about 6 cm.

6. The apparatus of claim 3, wherein the meshed openings of the second conveyor screen are about 6 cm to about 8 cm.

7. The apparatus of claim 3, wherein the organic matter screen is formed of nylon net and has about 200 to about 400 meshed openings.

8. The apparatus of claim 3, further comprising a further channel located between the inclined channel and the outlet, the further channel is less inclined than the inclined channel, wherein the further channel has a trough and a drain pipe connected to the trough for discharging sand and small rubbish in the trough.

9. The apparatus of claim 8, wherein the further channel has a water surface, said apparatus further comprising an upward inclined conveyor partially submerged below the water surface of the further channel for collecting floated rubbish in the further channel.

10. The apparatus of claim 8, wherein the trough is V-shaped.

\* \* \* \* \*